March 24, 1964  G. E. WILLIAMS  3,126,041
TIRE CONSTRUCTION
Filed March 13, 1963  2 Sheets-Sheet 1
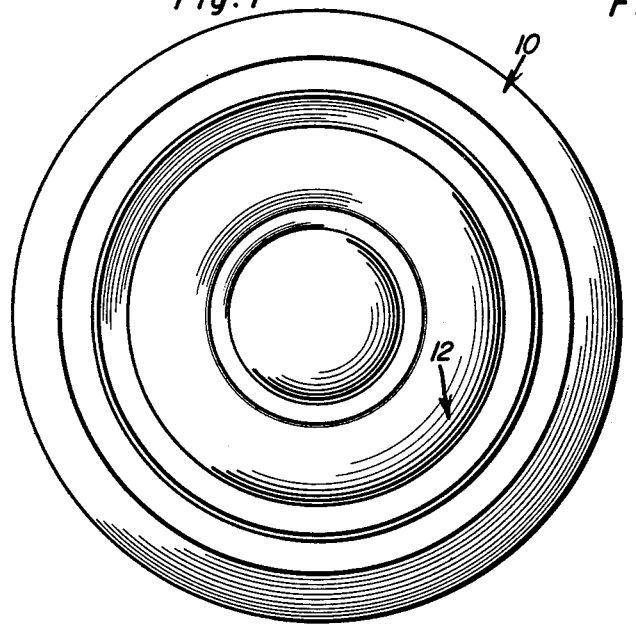
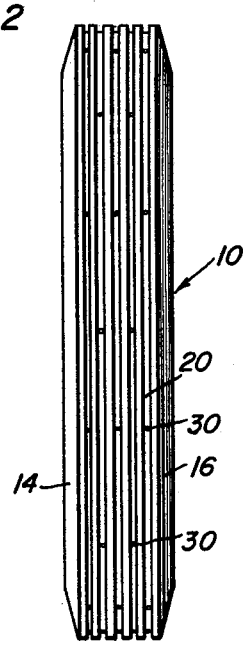
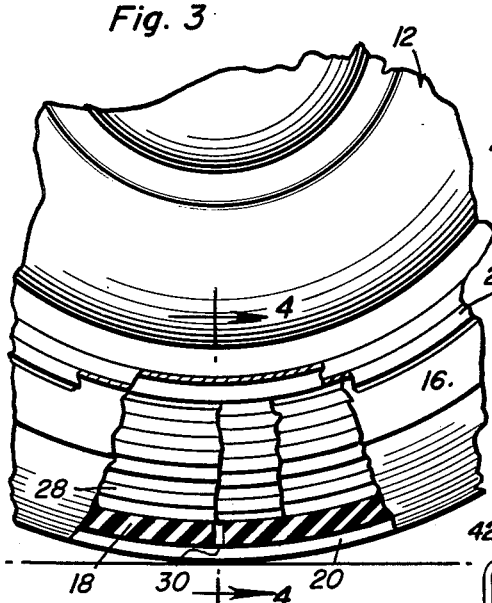
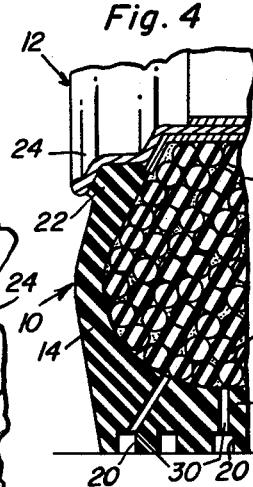
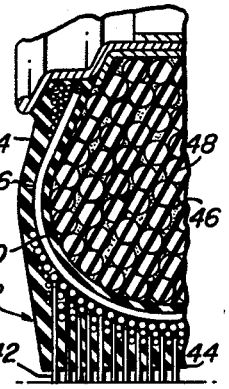
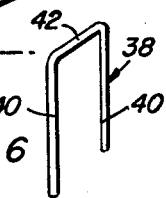
Gordon E. Williams
INVENTOR.

March 24, 1964 G. E. WILLIAMS 3,126,041
TIRE CONSTRUCTION

Filed March 13, 1963 2 Sheets-Sheet 2

Gordon E. Williams
INVENTOR.

BY
Attorneys

United States Patent Office 3,126,041
Patented Mar. 24, 1964

3,126,041
TIRE CONSTRUCTION
Gordon E. Williams, 113 Goddard St., Athol, Mass.
Filed Mar. 13, 1963, Ser. No. 264,969
5 Claims. (Cl. 152—315)

This invention relates to a novel and useful tire construction and more specifically to a tire which is adapted to be secured to a conventional type of wheel rim and which is filled with elongated strands of rubber-like material disposed in convolutions and extending about the casing in and substantially filling the air chamber defined between the side walls of the tire casing. With this type of tire construction the conventional air chamber is substantially entirely filled with rubber-like material which comprises a substitute for the cushioning effect of the air normally disposed in this chamber under a pressure greater than the pressure on the exterior of the tire casing.

The tire construction of the instant invention is also provided with means whereby it will afford far more traction on icy surfaces than is afforded by a conventional tire. The tire construction of the instant invention has wire members embedded therein and each wire member has a pair of leg members interconnected at one pair of corresponding ends by means of a bight portion generally paralleling the corresponding portion of the crown of the tire while the other pair of ends of the legs of each wire member project generally radially outwardly of the casing at their free ends and through the outer surface of the crown of the tire. Accordingly, upon rolling engagement of the tire with its supporting surface, certain portions of the rubber from which the casing is constructed will be compressed thereby exposing the ends of the free ends of the legs of the wire members to grip the supporting surface for the tire.

The tire construction of the instant invention also includes passages communicating the rubber filled air chamber thereof with the exterior of the crown portion of the tire. In this manner, as the tire rolls over its supporting surface and is thereby flexed, quantities of air will be sucked into and forced out of the tire casing affording a cooling action to the interior thereof which is substantially entirely filled with elongated strands of rubber-like material disposed in convolutions and extending about the casing.

The main object of this invention is to provide a tire construction relying upon the deformability and resiliency of a filler substance in lieu of air pressure for enabling the tire to support appreciable loads.

Another object of this invention, in accordance with the immediately preceding object, is to provide novel means by which the substantially rubber-filled interior of the tire casing may be adequately cooled in a novel manner so as to prevent an excessive buildup of heat within the tire due to its flexing while supporting heavy loads and traveling at high speeds.

Still another object of this invention is to provide a tire construction including reinforced side walls which will be substantially unpenetrable by substantially all objects which might come in contact with the side walls during normal use of the tire.

A final object of this invention to be specifically enumerated herein is to provide a tire construction in accordance with the preceding objects which will conform to conventonal forms of manufacture, be of simple construction and dependable in operation so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the tire construction of the instant invention shown mounted upon a wheel rim;

FIGURE 2 is an end elevational view of the tire construction illustrated in FIGURE 1;

FIGURE 3 is an enlarged fragmentary side elevational view of the tire construction shown in FIGURE 1 with parts thereof being broken away and shown in section;

FIGURE 4 is an enlarged fragmentary transverse vertical sectional view taken substantially upon the plane indicated by the section line 4—4 of FIGURE 3;

FIGURE 5 is a fragmentary transverse vertical sectional view similar to that of FIGURE 4 but showing a modified form of tire construction;

FIGURE 6 is a perspective view of one of the wire traction members utilized in the construction of the modified tire illustrated in FIGURE 5;

Figure 7:
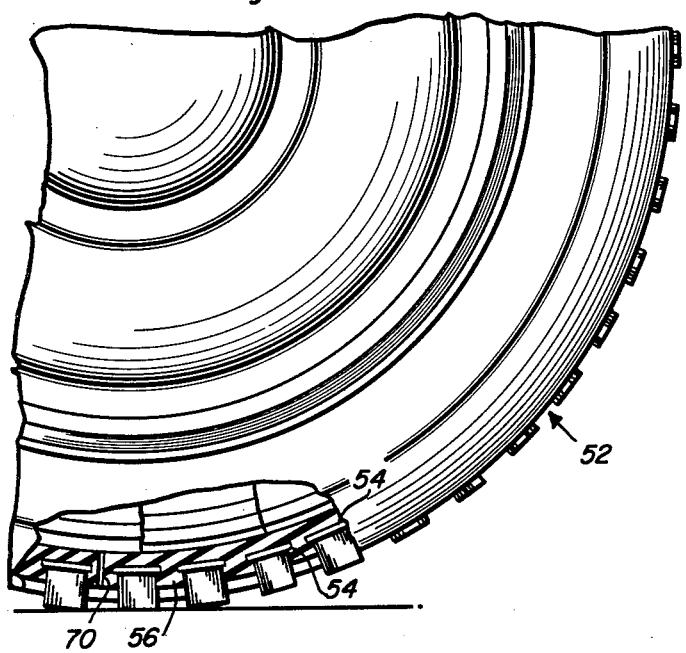
FIGURE 7 is an enlarged fragmentary side elevational view of a further modified form of the tire construction with parts thereof being broken away and shown in section.

Referring now more specifically to the drawings the numeral 10 generally designates the tire construction of the instant invention which is shown in FIGURE 1 of the drawings mounted upon a conventional wheel rim generally referred to by the reference numeral 12.

As can best be seen from FIGURES 3 and 4 of the drawings, the tire construction includes a pair of side walls 14 and 16 which are interconnected at their outer peripheries by means of a crown portion 18. The crown portion 18 has a plurality of circumferential grooves 20 formed in its outer peripheral surface defining a tread design of the tire 10.

The side walls 14 and 16 of the tire construction 10 each include bead portions 22 for engagement with the retaining flanges 24 of the wheel rim 12 and the air chamber 26 normally defined between the side walls 14 and 16 and the crown portion 18 is filled with elongated strands 28 of rubber-like material. In addition, the crown portion 18 includes a plurality of passages 30 which communicate the outer peripheral portions of the chamber 26 with the bottoms of the grooves 20.

With attention now directed to FIGURES 5 and 6 of the drawings there will be seen a modified form of tire construction generally referred to by the reference numeral 32. The tire construction 32 is similar to the tire construction 10 with the exception that the side walls 34 construction thereof are reinforced with strands 36 of steel cable. In addition, the tire construction 32 includes wire traction members generally referred to by the reference numeral 38, see FIGURE 6, which each include a pair of leg members 40 interconnected at one pair of corresponding ends by means of a bight portion 42. The wire strands 36 are criss-crossed diagonally across the crown portion 44 and some pass between the leg members 40 of the traction members 38. The free ends of the leg members 40 project outwardly of the crown portion 44 and it will be seen that the air chamber 46 is also filled or substantially filled with strands 48 of rubber-like material. In addition, the space between adjacent strands 48 is filled with a rubber-like fill material 50 if so desired.

It is to be understood that the tire construction 32 is also provided with passages similar to passages 30 and that the operation of the tire construction 32 is substantially identical to the operation of the tire construction 10 with the exception that the tire construction 32 is reinforced by means of the wire or cable strands 36 and that it is provided with the traction members 42.

Figure 8:
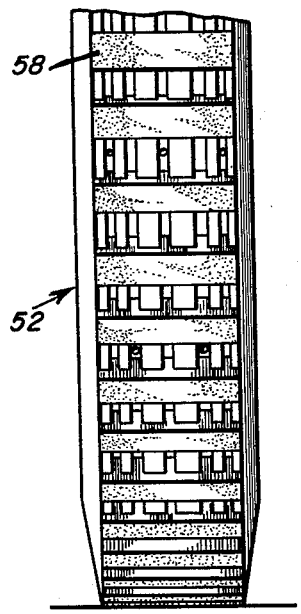
FIGURE 8 is a fragmentary end elevational view of the tire construction illustrated in FIGURE 7.
Figure 9:
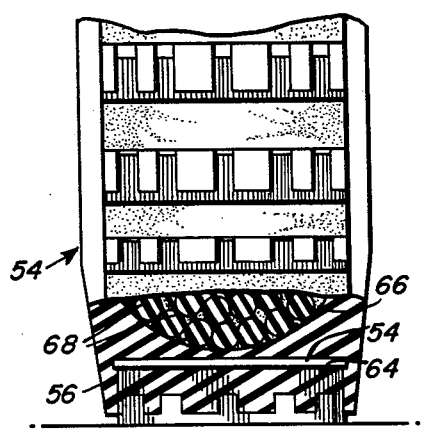
FIGURE 9 is a fragmentary transverse vertical sectional view similar to that of FIGURE 4 but of the modified form of tire construction shown in FIGURES 7 and 8.
Figure 10:
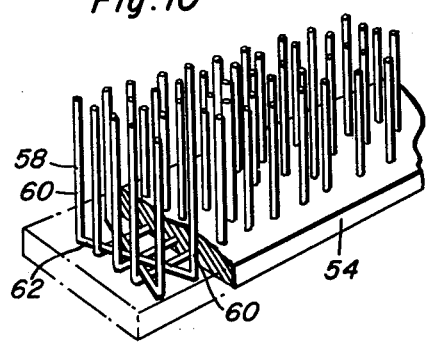
FIGURE 10 is a perspective view of one of the mounting members for the wire members utilized in the construction of a modified form of the invention, parts of the mounting member being broken away and shown in section.

With attention now directed to FIGURES 7–10 of the drawings there will be seen a still further modified form of tire construction generally referred to by the reference numeral 52 and which is constructed in substantially the same manner as the tire construction 10 with the exception being that a plurality of generally rectangular anchor or mounting members 54 are embedded in the crown portion 56 and extend transversely thereacross. The anchor members 54 each have a plurality of wire traction members 58 embedded therein which are similar in construction to the wire traction members 38. Each of the traction members 58 also includes a pair of leg members 60 interconnected at their inner ends by means of a bight portion 62. The tire construction 52 also includes reinforcing members 64 in the crown portion 56 which extend and crisscross over the anchor members 54. If it is desired, the air chamber 66 of the tire construction 52 may also have the spaces therein between adjacent ones of the strands 68 filled with rubber-like filler material. Additionally, it will be noted that the crown portion 56 of the tire construction 52 also includes passages 70 which are similar to passages 30.

Each form of the tire construction disclosed is provided with the strands of rubber-like material between the side walls thereof and with passages communicating the air chamber with the outer periphery of the crown portion of that tire construction. The tire construction illustrated in FIGURE 5 includes the individual wire traction members 38 and the reinforcing cords 36. The modified tire construction 52 is similar to the tire construction 10 with the exception that it is provided with the group of wire traction members embedded in the anchor members 54 and it is also provided with the crisscrossed cords 64.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tire construction comprising a casing including a pair of generally parallel annular side wall members interconnected at their outer peripheries by means of an integral crown portion and defining an air chamber therebetween, and a plurality of condition continuous solid strands of rubber-like material each being of a diameter a small fraction of the distance between said side wall members disposed in side-by-side closely grouped convolutions extending about said casing forming a filter for said air chamber of a cross-sectional shape corresponding to the cross-sectional shape of said air chamber and substantially entirely filling the latter.

2. The combination of claim 1 wherein said casing includes means defining a plurality of air passages communicated with said air chamber at one end and opening outwardly of said casing through said crown portion at the other end.

3. The combination of claim 1 wherein said crown portion has wire members embedded therein each having a pair of leg members interconnected at one pair of corresponding ends by means of a bight portion generally paralleling the corresponding portion of said crown, the other pair of ends of said legs projecting generally radially outwardly of said casing at their free ends.

4. The combination of claim 3 wherein said crown portion includes layers of crisscrossed cord reinforcing members extending diagonally across said crown portion, at least some of said cord reinforcing members passing between the legs of each pair of said legs.

5. The combination of claim 4 wherein said wire members are arranged in sets, the wire members of each set being embedded in an elongated anchor member extending transversely of said crown portion and embedded in the latter, said casing including air passes communicated with said air chamber at one end and opening outwardly of said casing through said crown portion at the other end.

References Cited in the file of this patent

UNITED STATES PATENTS

| | | |
|---|---|---|
| 903,715 | Hawley et al. | Nov. 10, 1908 |
| 1,864,939 | Respess | June 28, 1932 |
| 2,368,974 | Dietz | Feb. 6, 1945 |
| 2,650,642 | Reheiser | Sept. 1, 1953 |

FOREIGN PATENTS

| | | |
|---|---|---|
| 259,415 | Great Britain | Oct. 14, 1926 |